United States Patent
Greene

(10) Patent No.: US 8,095,638 B2
(45) Date of Patent: Jan. 10, 2012

(54) SYSTEMS AND METHODS FOR HARVESTING EXPIRED SESSIONS

(75) Inventor: Spencer Greene, Palo Alto, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 251 days.

(21) Appl. No.: 12/541,718

(22) Filed: Aug. 14, 2009

(65) Prior Publication Data

US 2009/0307357 A1    Dec. 10, 2009

Related U.S. Application Data

(62) Division of application No. 10/424,794, filed on Apr. 29, 2003, now Pat. No. 7,600,008.

(60) Provisional application No. 60/418,371, filed on Oct. 16, 2002.

(51) Int. Cl.
    *G06F 15/173* (2006.01)
(52) U.S. Cl. ............ 709/223; 709/226; 709/224
(58) Field of Classification Search .......... 709/223, 709/224, 227, 226
    See application file for complete search history.

(56) References Cited

U.S. PATENT DOCUMENTS

| | | | |
|---|---|---|---|
| 6,081,507 A * | 6/2000 | Chao et al. ............ 370/235 |
| 6,160,805 A | 12/2000 | Averbuch et al. | |
| 6,205,150 B1 * | 3/2001 | Ruszczyk ............ 370/412 |
| 6,684,203 B1 * | 1/2004 | Waddington et al. ....... 707/714 |
| 6,816,455 B2 | 11/2004 | Goldberg et al. | |
| 2001/0042058 A1 * | 11/2001 | Harrington et al. ....... 707/1 |
| 2002/0054587 A1 | 5/2002 | Baker et al. | |
| 2002/0155852 A1 * | 10/2002 | Bender ............ 455/522 |
| 2002/0169868 A1 | 11/2002 | Lopke et al. | |
| 2004/0046021 A1 | 3/2004 | Chung | |

OTHER PUBLICATIONS

Co-pending U.S. Appl. No. 10/424,794, filed Apr. 29, 2003; Spencer Greene, entitled "Systems and Methods for Harvesting Expired Sessions".

* cited by examiner

*Primary Examiner* — Ario Etienne
*Assistant Examiner* — El Hadji Sall
(74) *Attorney, Agent, or Firm* — Harrity & Harrity, LLP

(57) ABSTRACT

A system harvests sessions in a network device. The system receives a first data unit associated with a session and installs the session in a first queue until expiration of a first time period. The system installs the session in a second queue until the occurrence of at least one of an expiration of a second time period and a receipt of a data unit associated with the session. The system harvests the session upon expiration of the second time period.

17 Claims, 6 Drawing Sheets

SYSTEMS AND METHODS FOR HARVESTING EXPIRED SESSIONS

CROSS REFERENCE TO RELATED APPLICATIONS

This application is a divisional of U.S. patent application Ser. No. 10/424,794, filed Apr. 29, 2003, which claims priority from provisional application No. 60/418,371, filed Oct. 16, 2002, the disclosures of which are incorporated by reference herein in their entirety.

BACKGROUND OF THE INVENTION

1. Field of the Invention

The present invention relates generally to sessions, and more particularly, to systems and methods for harvesting expired sessions.

2. Description of Related Art

Conventional network devices, such as, for example, routers or Ethernet switches, typically handle data units, such as, for example, packets, associated with multiple sessions over any given interval of time, where an individual session may represent, for example, a single stream of data units between a source and destination in a network. Upon receipt of an initial data unit of a session, the network devices allocate resources for handling the session. Because network devices have finite resources, the capability of the network device to handle subsequent sessions is limited due to resource constraints. Therefore, the sooner a network device can "harvest" a session (i.e., reclaim resources allocated to the session), the sooner additional sessions can be handled by the network device.

Conventionally, many techniques have been implemented for harvesting expired sessions. One common technique involves maintaining a single time stamp associated with each session. Each data unit arriving for an existing session updates the time stamp for that session. A background process may sweep through the time stamps periodically and harvest any that have not been updated within a specified amount of time. This technique, however, requires numerous memory accesses for updating and checking the time stamps associated with each session. Such memory accesses can be expensive in terms of updating and checking the time stamps, requiring additional memory and memory bandwidth.

Therefore, there exists a need for systems and methods that can reduce the memory accesses that are associated with a session aging process in a network device.

SUMMARY OF THE INVENTION

Systems and methods consistent with the principles of the invention address this and other needs by implementing dual lists for determining which sessions at a network device should be aged, and corresponding resources harvested. The dual lists, consistent with the principles of the invention, may include a cache list and a pending harvest list. The cache list may store session identifiers associated with each session when a first data unit of each session is encountered, with the session identifiers being time stamped upon storage in the cache list. The time stamp for each session may be subtracted from a current time to determine whether the resulting value exceeds a pre-selected first timer period. If so, the corresponding session entries are removed from the cache list and installed in the pending harvest list, with the session entries being time stamped a second time upon installation in the pending harvest list. The time stamps for each session may then be subtracted from a current time to determine whether the resulting value exceeds a pre-selected second timer period. If so, the corresponding sessions are deleted from the pending list and "harvested." Through the automatic removal of sessions from the cache list and the pending harvest list after expiration of associated timers, without requiring continuous updates of session entries upon receipt of data units associated with the session, systems and methods consistent with the present invention reduce the number of memory accesses that are associated with conventional aging techniques.

One aspect consistent with principles of the invention is directed to a method of aging a data session in a network device. The method includes receiving a first data unit associated with the session and storing a session identifier associated with the session in a first list. The method further includes initiating a first timer upon storing the session identifier in the first list and storing the session identifier in a second list subsequent to expiration of the first timer. The method also includes initiating a second timer upon storing the session identifier in the second list and aging the session based on whether another data unit associated with the session is received prior to expiration of the second timer.

A second aspect consistent with principles of the invention is directed to a method of processing session data units. The method includes processing, prior to expiration of a first timer, multiple data units associated with the session using a first processing path. The method also includes processing, upon expiration of the first timer, a further data unit associated with the session using a second processing path.

Another aspect consistent with principles of the invention is directed to method of aging data sessions in a network device. The method includes initiating first and second timers, wherein the first and second timers are associated with a data session. The method further includes selectively aging the data session based on whether both of the first and second timers have expired.

BRIEF DESCRIPTION OF THE DRAWINGS

The accompanying drawings, which are incorporated in and constitute a part of this specification, illustrate exemplary embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the principles of the invention implement mechanisms for aging and harvesting sessions. For example, aging of sessions, consistent with the principles of the invention, involves dual session lists and associated timers that determine whether a given session will be harvested. Upon receipt of a first data unit of a session, a session entry identifying the session can be installed in a cache list and a first timer may be initiated. When the first timer expires, the session entry may be moved from the cache list to a pending harvest list and a second timer may be initiated, regardless of whether any new data units associated with the session were received during the period of the first timer. If a data unit associated with the session is not received before expiration of the second timer, then the session may be deleted from the pending harvest list and, thus, harvested. Resources allocated to the harvested session may then be re-allocated to other sessions.

Exemplary Network Device

Figure 1:
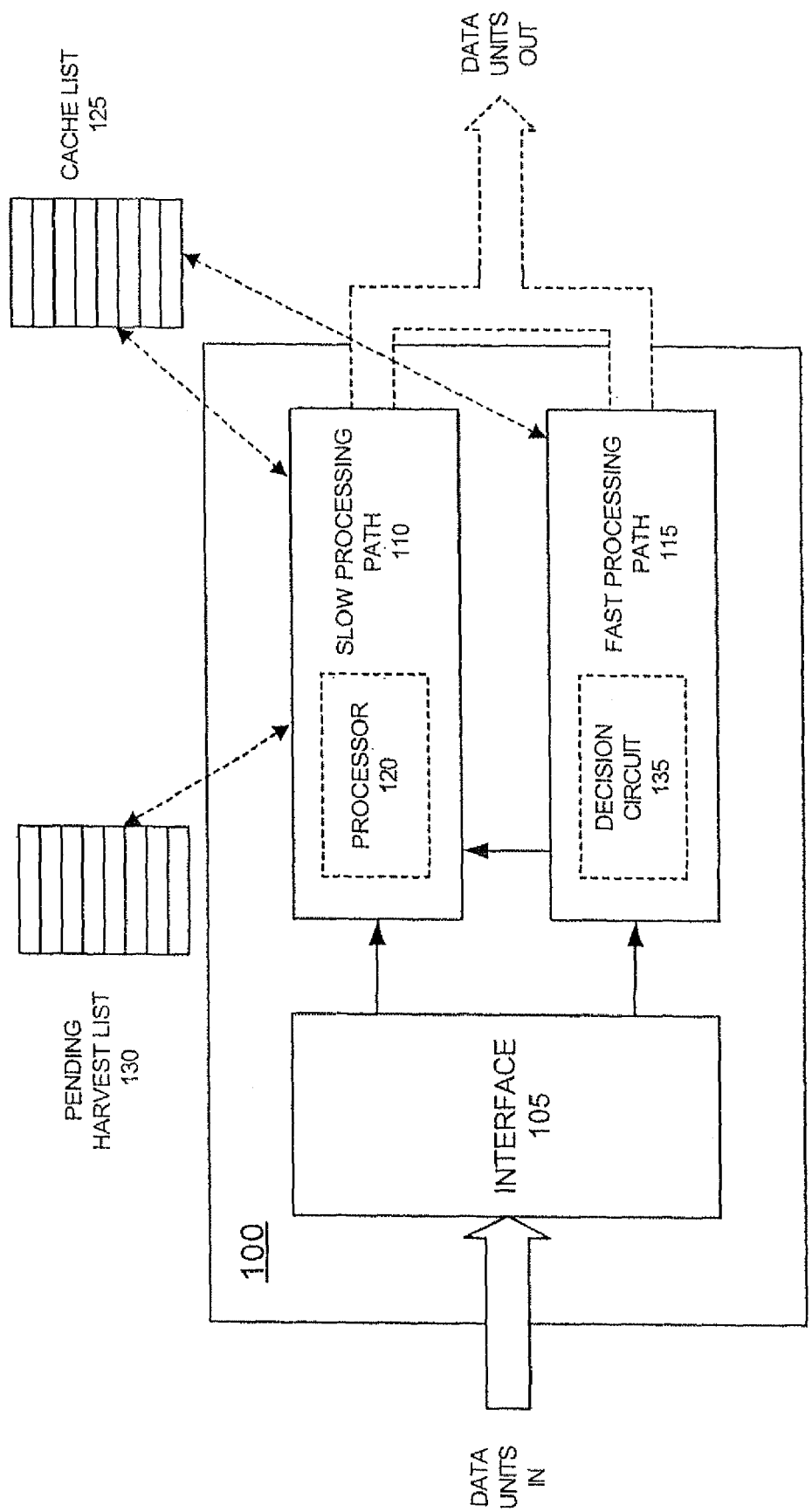
FIG. 1 is a diagram of an exemplary network device in which systems and methods consistent with the principles of the invention may be implemented.

FIG. 1 is a diagram of an exemplary network device 100 in which systems and methods consistent with the principles of the invention may be implemented. Network device 100 may receive data units, such as packets, that are associated with one or more sessions from one or more physical links. A data unit refers to a packet, cell, datagram, a fragment of a packet, datagram or cell, a database record, or other types of data. Network device 100 may process the data units to determine destination information and transmit the data units on one or more links in accordance with the destination information.

Network device 100 may include an interface 105, a slow processing path 110, a fast processing path 115, a cache list 125 and a pending harvest list 130. Interface 105 may receive incoming streams of data units and send each received data unit to a decision circuit 135 of fast processing path 115. Decision circuit 135 may determine which of the received data units are passed off to be processed by slow processing path 110, or are processed by fast processing path 115. Slow processing path 110 may include a general-purpose processor 120, or other device, for processing incoming data units. One or more memory devices (not shown) may be associated with processor 120 to store instructions for execution by processor 120, and to store data used in data unit processing. The one or more memory devices may further store cache list 125 and pending harvest list 130. Processor 120 may perform network device data unit processing in accordance with conventional software or hardware implementations.

Fast processing path 115 may include a faster path, such as a hardware implementation, consistent with the principles of the invention, that processes incoming data units at a faster rate, or at a lower expense, than slow processing path 110. Slow processing path 110 and fast processing path 115, thus, permit a hybrid software/hardware approach in which software processes some data units and hardware processes other data units. The overall data stream processing speed of the network device may thus be accelerated due to the higher processing rate of the hardware implemented fast processing path.

Network device 100 may additionally include a clock (not shown) for deriving a current time (T) that can be used in the list handling processes (see below) consistent with the principles of the invention.

Exemplary Cache List

Figure 2A:
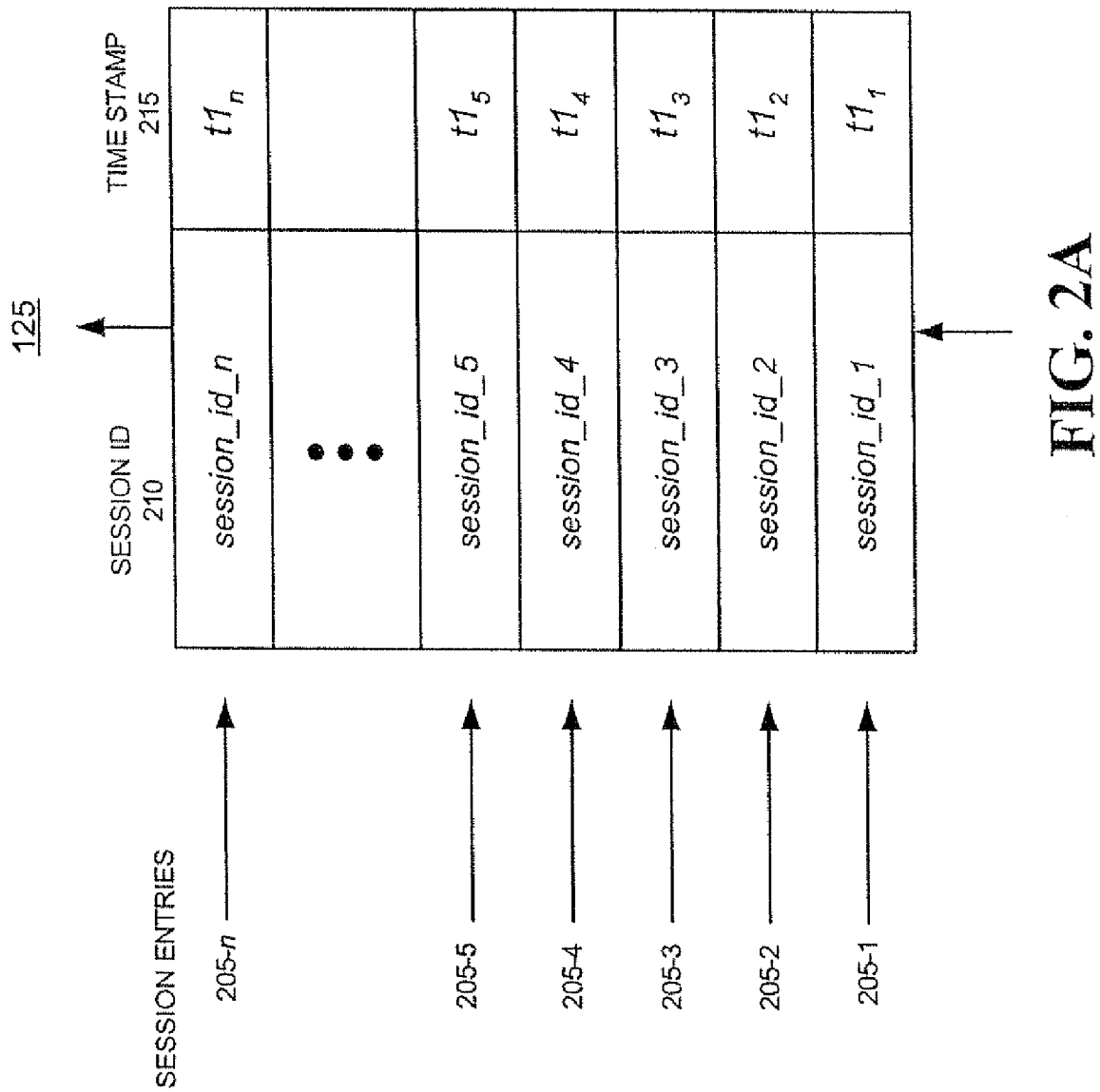
FIG. 2A is a diagram of an exemplary cache list according to an implementation consistent with the principles of the invention.

FIG. 2A illustrates an exemplary cache list 125 consistent with the principles of the invention. Cache list 125 may store one or more session entries 205-1 through 205-n for each session received at network device 100. Each session entry may include a session identifier 210 and a time stamp 215. Session identifier 210 may identify a session by a variety of types of information. For example, source and destination addresses included in corresponding session data units may be used to identify a session. Each session may receive a time stamp 215 that marks a time at which a session entry 205 is installed in cache list 125. Cache list 125 may include a first-in-first-out (FIFO) queue in which the session entry 205 at the top of the cache list 125 represents the oldest un-expired session, as indicated by time stamp 215.

A searchable structure or device (not shown), such as a content addressable memory (CAM), a hashing system, a tree, a trie, or other associative memory may be associated with cache list 125. The searchable structure or device may store each of the session identifiers 210 contained in each current session entry 205-1 through 205-n of cache list 125.

In one implementation consistent with the principles of the invention, in which a CAM is used for the searchable structure that stores the session identifiers, the CAM may have two valid bits per entry. One valid bit may be used when searching with only entries marked valid being eligible to participate in the search. The other valid bit may be used to indicate session identifiers that may be overwritten by a CAM add operation. When a t1 timer, associated with a session identifier, expires, the first bit may be set to invalid, causing the entry to be excluded from a decision circuit search when data units arrive (this is called "deleting" the session entry from cache list 125). If slow processing path 110 gets a data unit for this same session before a timer t2, associated with a session identifier, expires, it reinstates the first valid bit so that the session looks like it has always been there. When timer t2 expires, the harvesting process may examine the first valid bit. If the first bit is valid that means a data unit arrived during the t2 timer interval so the harvesting process does nothing. If it is invalid, then no data unit arrives and the session can be harvested. This is accomplished by setting the second valid bit also to invalid. Now the CAM entry associated with the session may be available to be re-used by a new session.

Many other implementations, which include one bit to exclude a session entry from search and the other to mark it available for re-use, may give an equivalent result to the above-described CAM. In one implementation, for example, a normal binary CAM, having only one valid bit, may perform both of the above functions. In another implementation, for example, a ternary CAM may be used in which decision circuit 135 uses a mask that requires the first valid bit to be true, as well as a match on the session identifier, whereas a search for an available empty CAM entry uses a mask that requires only the second valid bit to be true.

Exemplary Pending Harvest List

Figure 2B:
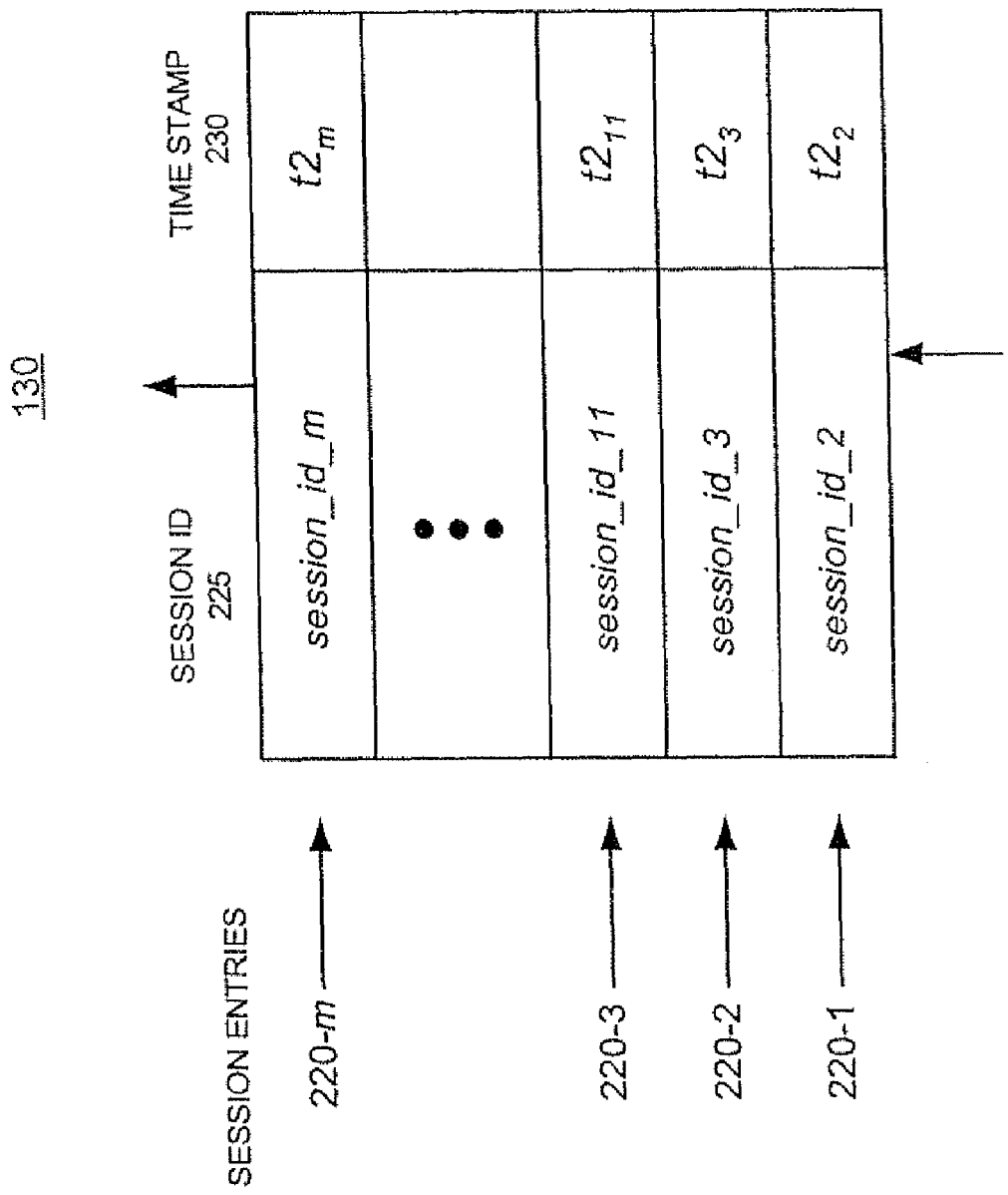
FIG. 2B is a diagram of an exemplary pending harvest list according to an implementation consistent with the principles of the invention.

FIG. 2B illustrates an exemplary pending harvest list 130 consistent with the principles of the invention. Pending harvest list 130 may store a session entry (e.g., session entries 220-1 through 220-m) for each session removed from cache list 125 subsequent to expiration of a pre-selected timer period. Each session entry may include a session identifier 225 and a time stamp 230. Session identifier 225 may identify a session by, for example, source and destination addresses included in corresponding session data units. Each session may receive a time stamp 230 that marks a time at which the session is removed from cache list 125 and installed in pending harvest list 130. Pending harvest list 130 may include a first-in-first-out (FIFO) queue in which the session entry at the top of the pending harvest list 125 represents the oldest unexpired or un-harvested session.

A searchable structure or device (not shown), such as a content addressable memory (CAM), a hashing system, a tree, a trie, or other associative memory may be associated with pending harvest list 130, similar to the searchable structure or device described above with respect to cache list 125. The searchable structure or device may store each of the session identifiers 225 contained in each current session entry 220-1 through 205-m of pending harvest list 130.

Exemplary Data Unit Handling Process

Figure 3:
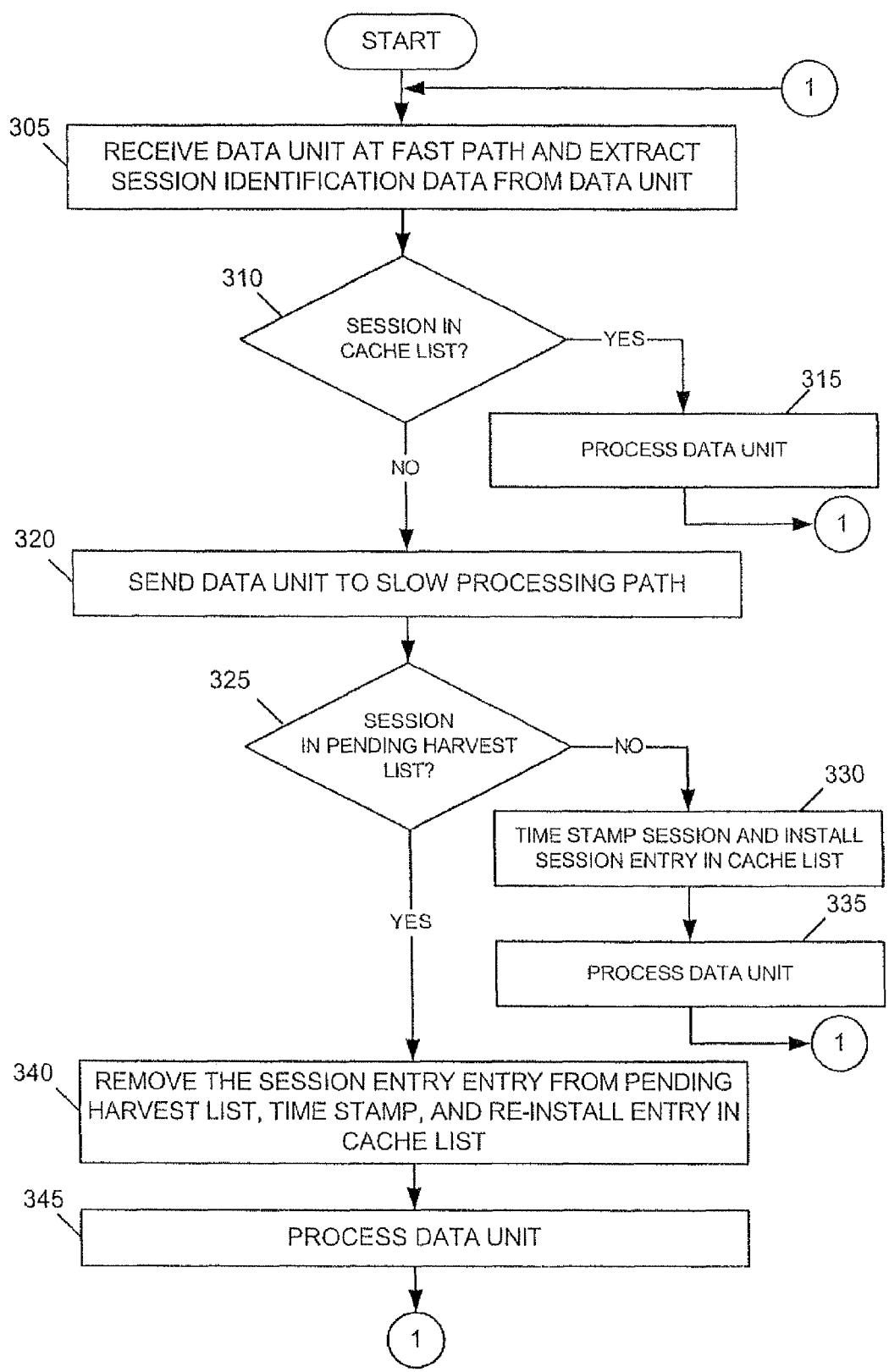
FIG. 3 is a flowchart of an exemplary session handling process according to an implementation consistent with principles of the invention.

FIG. 3 is a flowchart of an exemplary process for handling data units at network device 100 in accordance with implementations consistent with the principles of the invention. The exemplary process may begin with the receipt of a data unit at decision circuit 135 of fast path 115 and extraction of session identification data from the data unit [act 305]. For example, source and destination network addresses may be extracted from the data unit and a session identifier may be computed to identify the sequence of data units sent between the source and destination addresses. Decision circuit 135 may determine whether the session indicated by the session identification data is in cache list 125 [act 310]. To make this determination, a comparison, using any one of a variety of searchable structures or devices, such as, a CAM, a hashing system, a tree, a trie, other associative memory technique, may be made between the assigned session identifier and all the session identifiers stored in cache list 125. If the session is in cache list 125, fast processing path 115 may process the received data unit in a conventional manner [act 315]. This may include determining the data unit's destination information and forwarding the data unit. If the session is not in cache list 125, decision circuit 135 may send the received data unit to slow processing path 110 [act 320].

Slow processing path 110 may determine whether the session indicated by the session identification data is in pending harvest list 130 [act 325]. To make this determination, a comparison, using any one of a variety of well-known searchable structures or devices, such as a CAM, a hashing system, a tree, a trie, or other associative memory technique, may be made between the session identifier assigned to the data unit and all the session identifiers stored in pending harvest list 130. If the session is not in pending harvest list 130, then a new session has been identified and slow processing path 110 may time stamp (t1) the session and install a session entry in cache list 125, and in the corresponding CAM or searchable data structure associated with cache list 125 [act 330]. The session entry may include an identifier (session_id) for the session and the time stamp (t1). Slow processing path 110 may then process the data unit in accordance with conventional software data unit handling processes to determine destination information [act 335].

If the session is contained in pending harvest list 130, then slow processing path 110 may remove, mark invalid, or the like, the corresponding session entry from the pending harvest list 130, re-time stamp the entry with a new time stamp (t1), and re-install the entry as a session entry in cache list 125 [act 340]. The session entry may, for example, be re-installed at the bottom of cache list 125 and in the corresponding CAM or searchable data structure associated with cache list 125; or equivalently, if the session entry has been previously marked in cache list 125 as being invalid, the session entry may be re-activated by marking it as valid. Any state that had been accumulated by the session entry, such as counters, etc., prior to timer t1 expiration may be preserved. If the session entry was merely marked invalid in cache list 125, then by re-validating, the old state may be restored. If, on the other hand, the session entry was actually deleted from cache list 125, then prior to deletion, the state has to be transferred into pending harvest list 130. When the session entry is re-installed in cache list 125, then the state has to be re-installed as well.

Slow processing path 110 may then process then data unit in accordance with conventional software data unit handling processes [act 345]. The exemplary process of acts 305-345 may be repeated for each data unit received at network device 100.

Exemplary Cache List Handling Process

Figure 4:
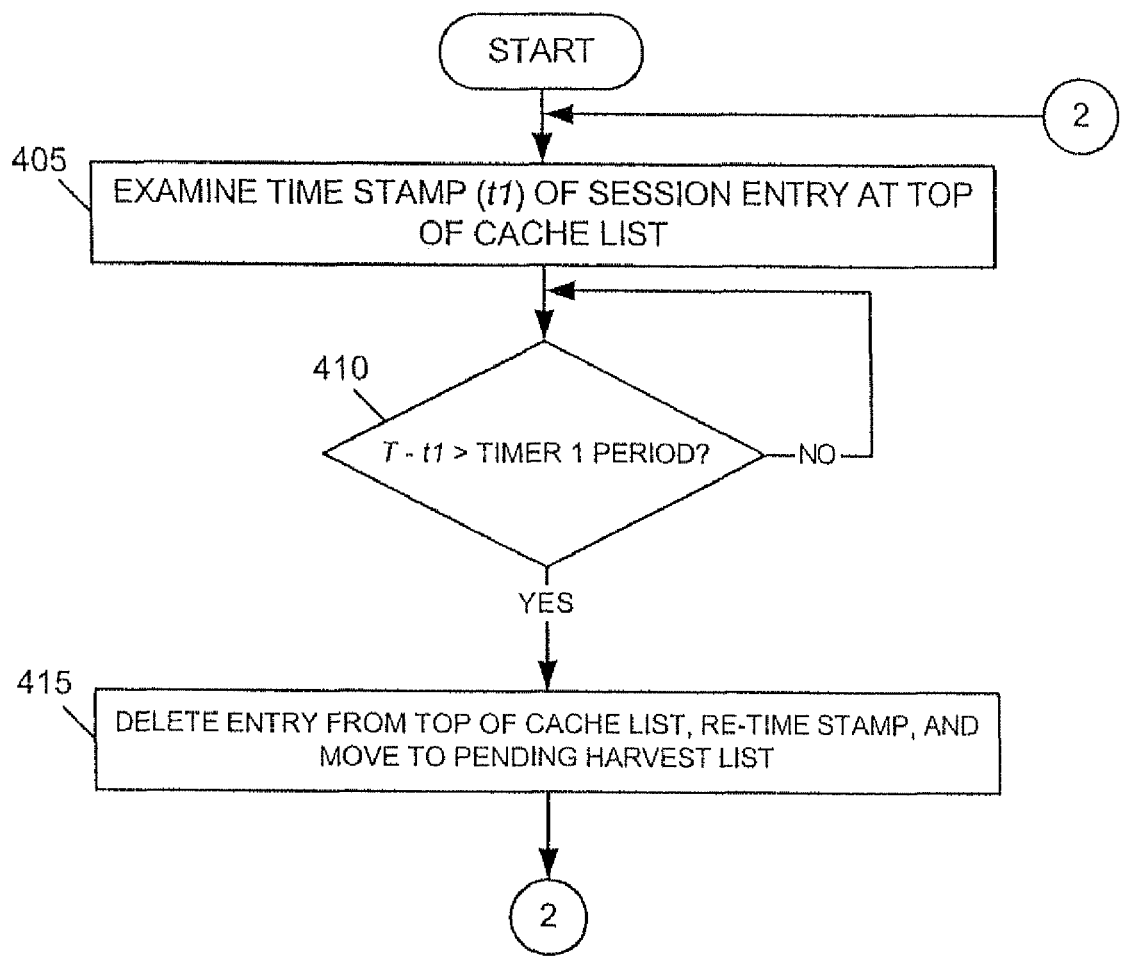
FIG. 4 is a flowchart of an exemplary cache list handling process according to an implementation consistent with principles of the invention.

FIG. 4 is a flowchart of an exemplary process for handling cache list 125 in accordance with implementations consistent with the principles of the invention. The exemplary process of FIG. 4 may be performed, by slow processing path 110, or by a different subsystem, in parallel with the exemplary data unit handling process described above with respect to FIG. 3. The exemplary cache list handling process may begin with an examination of a time stamp of the session entry at the top of cache list 125 [act 405]. Since the session entries of cache list 125 may be installed in a first-in-first-out manner, the session entry at the top of cache list 125 may represent the oldest unexpired session. A determination may be made whether the time stamp (t1) of the session entry at the top of cache list 125 subtracted from a current time (T) is greater than a pre-defined timer period (called "timer 1 period") [act 410]. The current time (T) may be derived from a clock that is internal or external to network device 100. The timer 1 period may be pre-selected based on a desired length of time before a given session is harvested. If T−t1 is greater than the timer 1 period, the session entry at the top of cache list 125 may be deleted, marked invalid, or the like, from cache list 125, re-time stamped, and moved to the bottom of pending harvest list 130 [act 415].

Exemplary Pending Harvest List Handling Process

Figure 5:
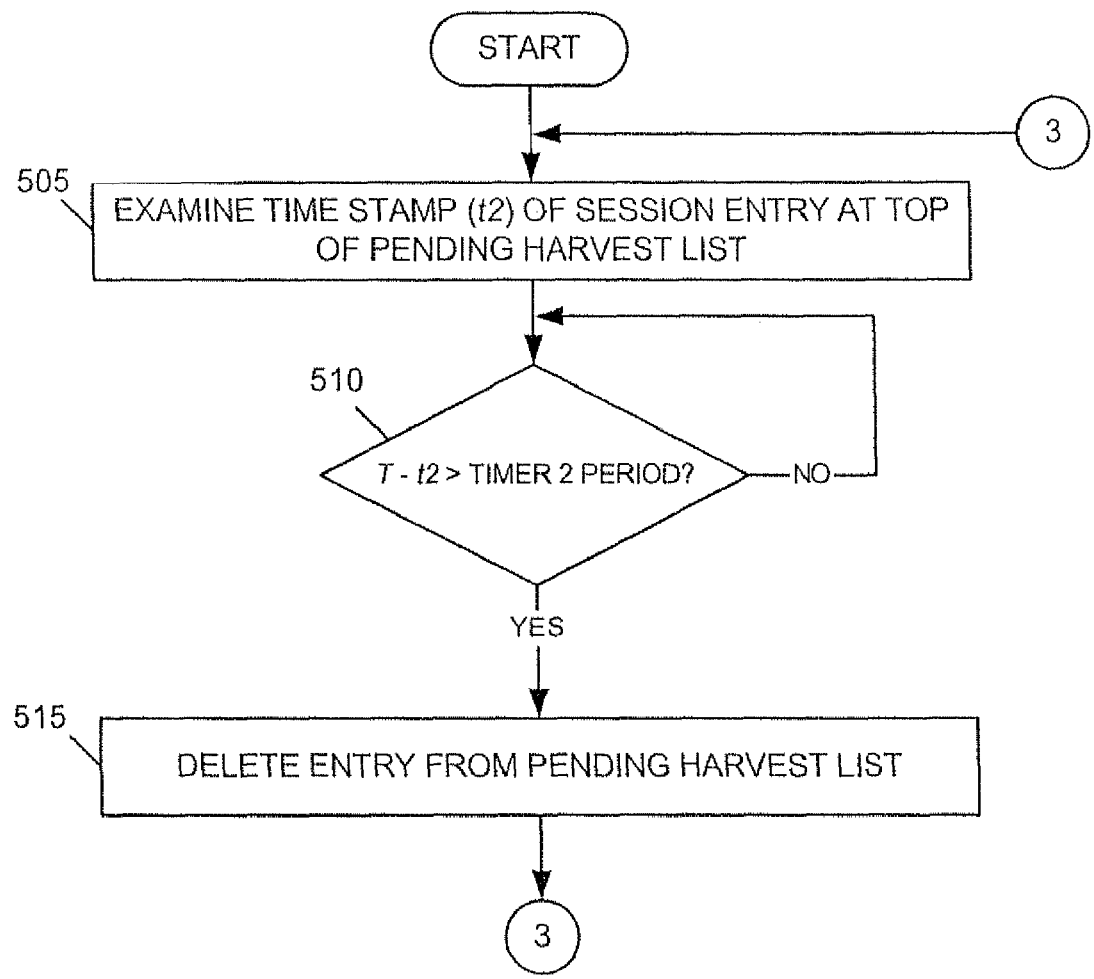
FIG. 5 is a flowchart of an exemplary pending harvest list handling process according to an implementation consistent with principles of the invention.

FIG. 5 is a flowchart of an exemplary pending harvest list process in accordance with implementations consistent with the principles of the invention. The exemplary process of FIG. 5 may be performed, by slow processing path 110, or by a different subsystem, in parallel with the exemplary cache list handling process described above with respect to FIG. 3, and in parallel with the exemplary pending harvest list handling process described above with respect to FIG. 4.

The exemplary pending harvest list handling process may begin with an examination of a time stamp (t2) of a session entry at the top of pending harvest list 130 [act 505]. A determination may be made whether the time stamp (t2) subtracted from a current time (T) is greater than a second pre-defined period (called "timer 2 period") [act 510]. The timer 2 period may be pre-selected based on a desired length of time before a given session is harvested. If T−t2 is greater than the timer 2 period, the session entry at the top of pending harvest list 130 may be deleted, marked invalid, or the like, from pending harvest list 130 [act 515]. The corresponding session may, thus, be harvested with the deletion of the session entry from pending harvest list 130, freeing up processing path resources for handling subsequent sessions that pass through network device 100.

Conclusion

Consistent with the principles of the present invention, sessions may be automatically harvested without the numerous per-data unit memory read and writes associated with conventional aging processes. Aging of sessions, consistent with the principles of the invention, involves dual session lists and associated timers that determine whether a given session will be harvested. When a first data unit, such as a packet or other type of communication entity, of a session is received, a session entry identifying the session can be installed in a cache list and a first timer may be initiated. When the first timer expires, the session entry may be moved from the cache list to a pending harvest list, regardless of whether any new data units associated with the session are received, and a second timer may be initiated. If a data unit associated with the session is not received before expiration of the second timer, then the session may be deleted from the pending harvest list and, thus, harvested. Resources allocated to the harvested session may then be re-allocated to other sessions.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. While series of acts have been described in FIGS. 3-4, the order of the acts may vary in other implementations consistent with the present invention. Also, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A network device, comprising:
   a first queue;
   a second queue;
   logic, implemented at least partially in hardware, to:
   receive a first data unit associated with a session,
   install the session in the first queue until expiration of a first time period,
   install the session in the second queue until an occurrence of at least one of an expiration of a second time period or a receipt of another data unit associated with the session,
   delete the session from the second queue and re-install the session in the first queue when a data unit associated with the session is received prior to the expiration of the second time period, and
   harvest the session upon the expiration of the second time period.

2. The device of claim 1, where the logic is further to:
   delete the session from the second queue subsequent to expiration of the second time period when the other data unit associated with the session is not received prior to the expiration of the second time period.

3. The device of claim 1, where the session comprises a sequence of data units associated with a source and destination in a network.

4. The device of claim 1, where the logic is further to:
   time stamp the session with a first time stamp upon installation in the first queue; and
   use the first time stamp to determine whether the first time period has expired.

5. The device of claim 1, where the logic is further to:
   time stamp the session with a second time stamp upon installation in the second queue; and
   use the second time stamp to determine whether the second time period has expired.

6. A system for harvesting sessions in a network device, the system comprising:
   a processor to:
   receive a first data unit associated with a session;
   install the session in a first queue until expiration of a first time period;
   install the session in a second queue until an occurrence of at least one of an expiration of a second time period or a receipt of a data unit associated with the session;
   delete the session from the second queue and re-install the session in the first queue when a data unit associated with the session is received prior to expiration of the second time period; and
   harvest the session upon expiration of the second time period.

7. A method comprising:
   receiving a first data unit associated with a session,
   installing the session in a first queue until expiration of a first time period,
   installing the session in a second queue until an occurrence of at least one of an expiration of a second time period or a receipt of another data unit associated with the session,
   deleting the session from the second queue and re-installing the session in the first queue when a data unit associated with the session is received prior to expiration of the second time period, and
   harvesting the session upon expiration of the second time period.

8. The method of claim 7, further comprising:
   deleting the session from the second queue subsequent to expiration of the second time period.

9. The method of claim 7, where the session includes a sequence of data units associated with a source and destination in a network.

10. The method of claim 7, further comprising:
    time stamping the session with a first time stamp upon installation in the first queue; and
    using the first time stamp to determine whether the first time period has expired.

11. The method of claim 7, further comprising:
    time stamping the session with a second time stamp upon installation in the second queue; and
    using the second time stamp to determine whether the second time period has expired.

12. The method of claim 7, further comprising:
    aging the session subsequent to expiration of the second time period.

13. The device of claim 1, where the logic is further to:
    age the session subsequent to expiration of the second time period.

14. The system of claim 6, where the processor is further to:
    delete the session from the second queue subsequent to expiration of the second time period when the other data unit associated with the session is not received prior to the expiration of the second time period.

15. The system of claim 6, where the processor is further to:
time stamp the session with a first time stamp upon installation in the first queue; and
use the first time stamp to determine whether the first time period has expired.

16. The system of claim 6, where the processor is further to:
time stamp the session with a second time stamp upon installation in the second queue; and
use the second time stamp to determine whether the second time period has expired.

17. The system of claim 6, where the processor is further to:
age the session subsequent to expiration of the second time period.

* * * * *